United States Patent [19]

Meyer et al.

[11] 3,723,767

[45] Mar. 27, 1973

[54] REED RELAY TYPE PERMANENT NOR MEMORY CIRCUIT

[75] Inventors: Charles F. Meyer, Wauwatosa; Robert A. Wieczorek, Glendale; Richard A. Waters, Milwaukee, all of Wis.

[73] Assignee: Square D Company, Park Ridge, Ill.

[22] Filed: Sept. 27, 1971

[21] Appl. No.: 183,781

[52] U.S. Cl. ..................307/238, 307/215, 307/291, 317/148.5 R, 317/155.5

[51] Int. Cl. .....G11c 11/34, H03k 3/26, H01h 47/00

[58] Field of Search ......307/215, 238, 291; 317/140, 317/155.5, 148.5 R

[56] References Cited

UNITED STATES PATENTS

| | | | |
|---|---|---|---|
| 3,158,761 | 11/1964 | Bullock | 307/291 X |
| 2,982,870 | 5/1961 | Hilbiber | 307/292 X |
| 3,042,900 | 7/1962 | Werts | 317/140 X |
| 3,174,081 | 3/1965 | Burnett | 317/155.5 |
| 3,350,652 | 10/1967 | Cottrez | 307/238 X |
| 3,418,646 | 12/1968 | Marcus | 307/291 X |
| 3,510,689 | 5/1970 | Baker | 307/291 X |
| 3,597,629 | 8/1971 | Bartlett | 307/238 |

*Primary Examiner*—Stanley D. Miller, Jr.
*Attorney*—Harold J. Rathbun et al.

[57] ABSTRACT

A circuit to be used with a transistorized logic memory which will cause the memory to be retentive when input power to the memory is interrupted and may be used in complex logic circuits, e.g., counters, shift registers, etc., which operate at high rates of speed. The retentive memory function is achieved by supplying inputs to the memory through a bistable state reed relay which causes the bistable state of the memory to correspond to the bistable state of the reed relay when power to the memory is initiated and supplying the outputs of the memory to the inputs of the reed relay which causes the bistable state of the reed relay to correspond to the bistable state of the memory when power to the memory is interrupted. The circuit is also arranged to prevent operation of the reed relay when the voltage of the direct current power source for the logic system is normal.

5 Claims, 2 Drawing Figures

Figure 2:
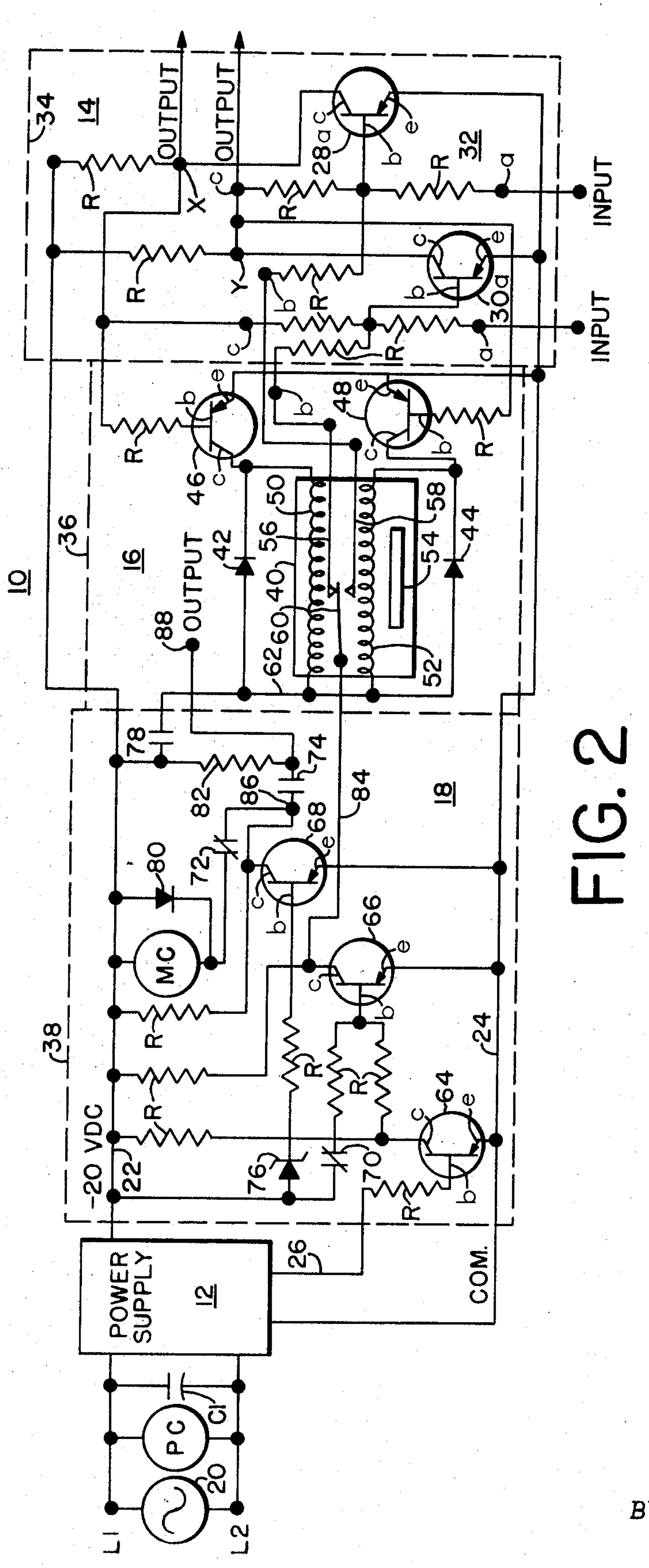

INVENTOR.
CHARLES F. MEYER
ROBERT A. WIECZOREK
RICHARD A. WATERS

BY William H. Schmeling

REED RELAY TYPE PERMANENT NOR MEMORY CIRCUIT

BACKGROUND OF THE INVENTION

This invention relates to transistorized logic control systems and more particularly to an improved means for imparting a retentive characteristic to transistorized logic memory circuit in a static logic control system.

Transistorized logic circuitry has been used in both sophisticated and simple static control systems to an increasing degree over the past few years because of the inherent reliability, low power requirements and relatively fast switching times of such circuitry. It has become common practice to employ transistorized NOR elements as building blocks in such systems to provide the required logic functions including a memory function which is achieved by using a pair of interconnected NOR elements.

A problem, however, may be encountered when using a pair of NOR elements as a memory, inasmuch as such a memory element does not inherently possess a retentive characteristic. The memory element tends to stabilize in its "natural" state upon the reapplication of power after a failure or interruption of power. The "-natural" state may or may not correspond to the last selected bistable state of the memory element. The "-natural" state is determined by the characteristics of the individual transistors and the impedance values of the associated circuitry.

Means have been used previously to provide a retentive characteristic for transistorized NOR memory elements. One such means, disclosed in U.S. Pat. No. 3,108,258, issued Oct. 22, 1963 and assigned to the assignee of the present invention, comprises a half-wave magnetic amplifier having opposing and aiding control windings. In the event of failure or interruption of power, the magnetic amplifier causes a NOR memory element to retain its last selected bistable state, depending upon the presence or absence of residual flux in the magnetic core as determined by the interaction of the associated control windings. Although a system employing such a magnetic amplifier has been found suitable for a great many applications, it is expensive to manufacture and difficult to apply in logic systems.

Another system which assured that the memories within a NOR logic system were retentive is disclosed in U.S. Pat. No. 3,249,769, issued May 3, 1966 and assigned to the assignee of the present invention, comprehends the use of a stand-by power source for the NOR logic system. The stand-by power source includes a pair of rechargeable batteries, one of which is connected between a negative power supply lead and ground and the other of which is connected between a positive power supply lead and ground. Each battery is arranged in cooperative relation with a resistor and a plurality of diodes interconnected so as to insure that the batteries continuously receive an appropriate trickle charge during the time primary power is available. Upon failure or interruption of the primary power, the batteries supply the minimum power requirements to only those NOR memory elements desired to be made retentive while at the same time the batteries are effectively prevented from discharging through the primary power source or other logic circuitry.

While the system employing such a stand-by power supply has proven highly satisfactory, it is not particularly suited for use in a system requiring a minimum number of retentive memories and has been found objectionable by users who, through prejudice or otherwise, refuse to incorporate batteries in their installations.

SUMMARY OF THE INVENTION

The invention is herein described as it might be applied in connection with a NOR memory in a negative voltage logic system and is equally applicable to other bistable state solid state logic elements in either negative or positive polarity logic systems. Further, as NOR memories are frequently combined to provide counters, shift registers, transfer memories and the like, the invention may be used to maintain these devices in their last switched state when power to the logic system is interrupted and restored.

It is an object of the present invention to provide a transistorized logic memory with a retentive character.

An additional object is to cause a bistable state of a reed relay to match a bistable state of a transistorized logic memory when power to the memory is interrupted and to cause the bistable state of the memory to match the bistable state of the relay when power is restored so that the memory will have a retentive characteristic.

A further object is to cause a bistable state of a reed relay means to match a bistable state of a transistorized logic memory when power to the memory is interrupted and to cause the bistable state of the memory to match the bistable state of the relay when power is restored and to prevent the reed relay from switching when power is supplied to the memory so that the reed relay will have a long life and the memory will have a retentive characteristic and the logic system will operate at its maximum speed and with minimum power requirements.

Further objects and features of the invention will be readily apparent to those skilled in the art from the following specification and from the appended drawing illustrating a preferred embodiment in which a schematic wiring diagram of a circuit incorporating the features of the present invention is shown.

Figure 1:
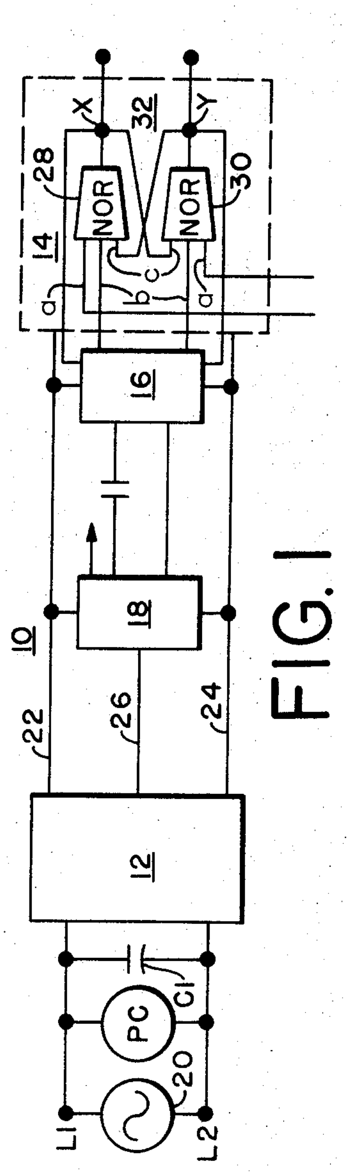

FIG. 1 is a block diagram of an exemplary static logic control system employing a transistorized logic memory and including an embodiment of the present invention; and FIG. 2 is a schematic wiring diagram of FIG. 1.

Referring to FIG. 1, a retentive memory logic circuit 10 portion of a static control system comprises a power supply section 12, a transistorized logic memory circuit module 14, a reed relay module 16 and a circuit module 18 for controlling the operation of the reed relay module 16. The system includes a relay having an operating coil PC and a capacitor C1. The power supply section 12, which per se does not constitute a feature of the present invention, is energized from an alternating current source 20 that is connected to a pair of terminals L1 and L2 and supplies the operating direct current power requirements for the modules 14, 16 and 18 over leads 22 and 24 with the lead 22 having a negative 20 volt DC potential with respect to a ground or common potential on the lead 24. The power supply section 12 also supplies a positive 20 volt DC potential through a lead, not shown, to the logic control system which is principally used for biasing purposes. The power supply section 12 also provides an OFF return signal at a lead 26 which appears as a negative potential pulse during the first few milliseconds after the AC power from the source 20 is first applied and interrupted. The power supply section 12 is arranged so that the voltage at the lead 22 increases and decreases exponentially when the power input from the source 20 is respectively initially applied and interrupted. The OFF return pulse on the lead 26 follows the build-up of the voltage on the lead 22 when power is initiated and is cut off when the voltage on the lead 22 reaches −12 VDC. When the power input to the power supply section 12 is interrupted, an OFF return pulse will appear on lead 26 during the interval when the voltage on the lead 22 decays from −12 VDC to zero.

In FIG. 1, a pair of transistorized NOR elements 28 and 30 are shown combined to form a NOR memory 32 in the memory logic circuit section 14. The structure and operation of a transistorized NOR element is well known so that detailed description is not necessary. In general, a negative voltage pulse, impressed on either one of the inputs *a*, *b* or *c* of the NOR element 28, results in the absence of an output signal at an output X of the NOR element 28. Similarly, a negative voltage pulse impressed on either one of the inputs *a*, *b* or *c* of the NOR element 30 results in the absence of an output signal at an output Y of the NOR element 30. The absence of a signal is customarily referred to as "0" and the presence of a signal as "1".

To form the NOR memory 32, the output Y of the NOR element 30 is connected to the input *c* of the NOR element 28, and the output X of the NOR element 28 is connected to the input *c* of the NOR element 30. A "1" signal at the input a of the NOR element 28 causes the signal at the output X to be "0" which, when combined with the absence of signals at the inputs *a* and *b* of the NOR 30, causes a "1" signal at the output Y. The "1" signal at the output Y is impressed on the input *c* of the NOR element 28 to maintain the NOR memory 32 in this bistable state, even though the "1" signal is removed from the input *a* of the NOR 28. The NOR memory 32 is switched to the other of its bistable states by applying a "1" input to the input a of the NOR 30. This changes the output at Y to "0", which, when impressed on the input c of the NOR element 28 and combined with the "0" input signals at the inputs *a* and *b* of the NOR element 28, changes the "0" signal at the output X to a "1" signal. The "1" signal at the output X is impressed on the input *c* of the NOR element 30 to maintain the NOR memory 32 in this bistable state upon removal of the "1" input at the input a of the NOR 30.

Referring to FIG. 2, the portion within the rectangle formed by the broken line 34 is the transistorized logic within the memory circuit module 14, the portion within the rectangle formed by the broken line 36 is the reed relay module 16, and the portion within the rectangle formed by the broken line 38 is the circuit module 18 which controls the operation of the reed relay module 16. The system also includes the coil PC and the capacitor C1 which are connected in parallel across the input terminals L1 and L2 to be energized by the source 20. The leads 22, 24 and 26 correspond to the leads 22, 24 and 26 in FIG. 1.

The transistorized logic memory circuit within the module 14, as shown in FIG. 2, comprises a pair of transistors 28*a* and 30*a* as switching units in a NOR circuit configuration. The transistors 28*a* and 30*a* are of the PNP type and each has an emitter *e* directly connected to the lead 24 and a collector *c* respectively connected to the outputs X and Y, each of which in turn is connected through a load resistor R to the lead 22. The inputs *a*, *b* and *c* of the transistors 28*a* and 30*a* correspond respectively to the inputs *a*, *b* and *c* of the NOR elements 28 and 30 in FIG. 1 with the inputs *a*, *b* and *c* each being connected through a load resistor R to a base *b* of the associated transistors 28*a* and 30*a*.

The reed relay module 16, as shown in FIG. 2, comprises a reed relay 40, a pair of diodes 42 and 44 and a pair of pnp type transistors 46 and 48. The reed relay 40 is a latching type reed relay having two isolated coil windings 50 and 52, a permanent magnet 54 and single pole double throw contacts including a pair of stationary contacts 56 and 58 and a movable contact 60. The contact 56 is formed of non-magnetic material and the contacts 58 and 60 are formed of permeable magnetic material. The contacts 56 and 58 are relatively inflexible and respectively extend in parallel spaced relation from one end of the reed relay 40 to the central portion of the reed relay 40. The contact 60 is formed of flexible material and extends from the opposite end of the reed relay 40 to the central portion of the reed relay 40 so as to be engageable with either of the contacts 56 or 58. The contact 60 is pre-stressed so that it normally engages the contact 56 and the magnet is positioned to provide a magnet flux through the contacts 58 and 60 which is insufficient to cause the contact 60 to move out of engagement with the contact 56 and sufficient to maintain an engagement between the contacts 60 and 58 when the contact 60 is moved into engagement with the contact 58. The coil winding 52 is wound and positioned to provide an output flux which aids the output flux of the magnet 54 and cause the contact 60 to move out of engagement with the contact 56 and into engagement with the contact 58 when the coil winding 52 is energized, The coil winding 50 is wound and positioned to provide an output flux which opposes the output flux of the magnet 54 and cause the contact 60 to move out of engagement with the contact 58 and permit the contact 60 to move into engagement with the contact 56 when the coil 50 is energized. Thus the reed relay is a bistable state device as it will be in one bistable state or its ON state when the contact 60 engages the contact 56 and in its other bistable or OFF state when the contact 60 engages the contact 58. The transistors 46 and 48 are of the PNP type and have their respective emitters e connected to the lead 24. The transistor 46 has its base b connected through a load resistor R to the output X and the transistor 48 has its base connected through a load resistor R to the output Y. The collector *c* of the transistor 46 is connected through a coil winding 50 to a lead 62. Similarly, the collector *c* of the transistor 48 is connected through the coil winding 52 to the lead 62. The diodes 42 and 44 are connected across the coil windings 50 and 52 respectively to conduct the induced currents when the coil windings 50 and 52 are de-energized.

The control circuit module 18 in addition to the coil PC and the capacitor C1 includes: pnp type transistors 64, 66 and 68, normally closed contacts 70 and 72 which are opened when the coil PC is energized, normally open contacts 74 which are closed when the coil PC is energized, a Zener diode 76, a relay having a coil winding MC and normally open contacts 78 which are closed when the coil winding MC is energized, a diode 80 and a resistor 82. The capacitor C1 is connected in parallel with the coil PC to delay the de-energization of the coil winding PC when the power from the source 20 is interrupted. The transistors 64, 66 and 68 each has an emitter e directly connected to the lead 24 and a collector *c* connected through a load resistor R to the lead 22. The transistor 64 has its base *b* connected through a load resistor R to the lead 26 and its collector *c* connected through a load resistor R to the base *b* of the transistor 66. The base *b* of the transistor 66 is also connected through a load resistor R and the normally closed contacts 70 to the lead 22. The collector *c* of the transistor 66 is connected through a lead 84 to the movable contact 60 in the reed relay module 16. The transistor 68 has a base b connected through a load resistor R and the Zener diode 76 to the lead 22. The collector *c* of the transistor 68 is connected to a junction 86 which is connected through the normally open contacts 74 to an output terminal 88. The junction 86 is also connected through the normally closed contacts 72 and the coil winding MC to the lead 22. The diode 80 is connected across the coil MC to conduct the induced currents when the coil winding MC is de-energized. The resistor 82 is connected between the lead 22 and the output terminal 88. The contacts 78 are connected between the lead 22 and the lead 62 in the reed relay module 16.

CIRCUIT OPERATION

During periods when the source 20 is supplying a normal power input to the power supply 12, the following conditions will prevail. The relay including the coil winding PC will be energized and the contacts 70 and 72 will be open and the contacts 74 will be closed. The lead 22 will be at −20 VDC potential relative to lead 24 and the OFF return signal on lead 26 will be "0". The open contacts 70 will permit the conduction of the transistor 66 to be controlled by the transistor 64. The open contacts 72 prevent the coil winding MC from being energized to close the contacts 78. The closed contacts 74 will permit the signal at the collector c of the transistor 68 to appear at the output terminal 88. The −20 VDC potential difference between the leads 22 and 24 exceeds the 12 VDC breakdown voltage of the Zener diode 76 so that transistor 68 is switched ON and a "0" at its collector *c* appears at the output terminal 88. The "0" OFF return signal on the lead 26 causes the transistor 64 to be switched OFF and a "1" to appear at its collector *c* which causes the transistor 66 to be switched ON and a "0" to appear at its collector *c*. The "0" at the collector *c* of the transistor 66, as delivered through the lead 84 and the contacts 60 and 56 or 58 of the reed relay 40 to the bases *b* of the transistors 28*a* or 30*a*, permits the transistors 28*a* or 30*a* to be switched in response to input signals at their inputs *a* or *c*.

The transistors 28*a* and 30*a*, Which are interconnected to provide the NOR memory 32, will have a selectable bistable conductive state that depends upon the most recent "1" input signal to the inputs *a* or *c* of the respective transistors 28*a* or 30*a*. If the most recent "1" input signal is received at the input a of the transistor 28*a*, the NOR memory 32 will be in one of its bistable states and a "0" will appear at the output X and a "1" to appear at the output Y. Similarly, if the most recent "1" input signal is received at the input a of the transistor 30*a*, the NOR memory 32 will be in the other of its bistable states and a "1" will appear at the output X and a "0" will appear at the output Y.

As previously described, the contacts 78 are open and the bases *b* of the transistors 28*a* and 30*a* are "0" during periods when the source 20 is supplying a normal power input to the power supply 12. The open contacts 78 prevent the coil windings 50 and 52 from being energized and the reed relay 40 from switching during normal operation of the circuit. The "0" input to the bases *b* of the transistors 28*a* or 30*a* from the transistor 66 permits the transistors 28*a* and 30*a* to be switched in response to "1" input signals at their respective bases *a* and *c* to provide a conventional NOR memory function as may be used in conventional logic systems.

An interruption of input power from the source 20 to the power supply 12 will cause the coil PC to be de-energized and the contacts 70 and 72 to close and the contacts 74 to open. The opening of the contacts 74 causes the potential at the output terminal 88 to instantly become −20 VDC which exponentially decays toward zero because of the connection provided by the resistor 82 between the output terminal 88 and the lead 22. The decaying −20 VDC potential provides a decaying logic "1" which may be used as a blocking signal to block input signals to the NOR memory 32 as well as counters, shift registers and the like in the logic system to prevent switching of the NOR memory 32 and the counters and the shift registers after the power input to the power supply 12 is interrupted.

The closed contacts 70 will cause the base *b* of the transistor 66 to be connected to the lead 22 and cause a decaying "1" to be supplied as an input to the transistor 66 to prevent the transistor 66 from being switched when the signal at the collector *c* of the transistor 64 momentarily becomes "0" in response to a momentary "1" OFF return signal on the lead 26 which occurs after the decaying potential on the lead 22 reaches −12 VDC. The decaying "1" input to the transistor 66 causes the transistor 66 to provide a "0" input to the bases *b* of the transistors 28*a* or 30*a* through the contacts of the reed relay 40 so the bistable state of the NOR memory 32 is not switched when power input to the power source 12 is interrupted.

During the interval when the potential on the lead 22 is decreasing from −20 VDC to −12 VDC the Zener diode 76 conducts and causes the transistor 68 to continue in its conductive state. The closed contacts 72 and the conducting transistor 68 cause the coil winding MC to be energized and the contacts 78 to close and complete a circuit between the lead 22 and the coil windings 50 and 52 so that the bistable state of the reed relay 40 will be caused to correspond to the bistable state of the NOR memory 32 as will now be described.

If the reed relay 40 is in one of its bistable states, called the ON state, which occurs when the contact 60 is in engagement with the contact 56, and the NOR memory 32 is in its ON state, which occurs when the output X is "1" and the output Y is "0", the closure of the contacts 78 will cause the coil winding 50 to be energized as follows. The "1" at the output X and the closed contacts 78 will cause the transistor 46 to conduct and the coil winding 50 to be energized and produce an output flux which opposes the output flux of the permanent magnet 54 so that the reed relay 40 remains in its ON state which corresponds to the bistable state of the NOR memory 32 when power from the source 20 was interrupted.

If the reed relay 40 is in its ON bistable state and the NOR memory 32 is in its OFF bistable state, which occurs when the output X is "0" and the output Y is "1", the closure of the contacts 78 will cause the coil winding 52 to be energized in response to the "1" at the output Y. The "1" at the output Y and the closed contacts 78 will cause the transistor 48 to conduct and the coil winding 52 to be energized and produce an output flux which aids the output flux of the permanent magnet 54. The flux outputs of the permanent magnet 54 and the coil winding 52, when combined are sufficient to cause the movable contact 60 to move out of engagement with the contact 56 and into engagement with the contact 58 and thereby switch the reed relay 40 to its OFF bistable state. The reed relay 40 is maintained in its OFF bistable state after the output flux of the coil winding 52 decreases to zero by the output flux of the permanent magnet 54 which is sufficient to overcome the spring bias of the flexible contact 60. Thus the reed relay 40 will remain in its OFF bistable state and correspond to the bistable state of the NOR memory 32 when the power from the source 20 was interrupted.

If the reed relay 40 is in its OFF state and the NOR memory 32 is in its ON state, the closure of the contacts 78 will cause the coil winding 50 to be energized in response to the "1" at the output X. The "1" at the output X and the closed contacts 78 will cause the transistor 46 to conduct and the coil winding 50 to be energized and produce an output flux which opposes and effectively cancels the output flux of the permanent magnet 54 which permits the movable contact 60 to move out of engagement with the contact 58 and into engagement with the contact 56 and thereby switch the reed relay 40 to its ON bistable state. The reed relay 40 will remain in its ON bistable state after the output flux of the coil winding 50 decreases to zero because the output flux of the permanent magnet 54 is insufficient to overcome the spring bias of the flexible contact 60. Thus the reed relay 40 will remain in its ON bistable state and correspond to the ON bistable state of the NOR memory 32 when the power from the source 20 was interrupted.

When the reed relay 40 is in its OFF bistable state and the NOR memory 32 is in its OFF bistable state, the closure of the contacts 78 will cause the coil winding 52 to be energized in response to the "1" at the output Y. The "1" at the output Y and the closed contacts 78 will cause the transistor 48 to conduct and the coil winding 52 to be energized and produce an output flux which aids the output flux of the permanent magnet 54 so that the flexible contact remains in engagement with the contact 58 and the reed relay 40 will be in an OFF bistable state which corresponds to the OFF bistable state of the NOR memory 32 when the power from the source 20 was interrupted.

The relay coil winding MC will remain energized and the contact 78 closed during the interval when the potential on the lead 22 is decreasing from −20 VDC to −12 VDC because of the closed contacts 72 and the conducting Zener diode 76 and the conducting transistor 68. The Zener diode 76 becomes nonconductive when the negative potential on the lead 22 is less than −12 VDC and blocks the emitter to base current of the transistor 68 which causes the transistor 68 to be nonconductive and the coil winding MC to be de-energized. The contacts 78 open when the coil winding MC is de-energized and thus prevent the reed relay from switching its bistable state which was previously made to correspond to the bistable state of the NOR memory 32 during the interval when the potential on the lead 22 is decreasing from −20 VDC to −12 VDC. During the interval when the potential on the lead 22 is decreasing from −12 VDC to zero, a decaying "1" signal present at the terminal 88 may be used to prevent further switching of the NOR memory 32 and other logic components in the logic system.

The power from the source 20 may remain OFF for an indefinite period during which the reed relay 40 will remain in a bistable state which corresponds to the bistable state of the NOR memory 32 when the power from the source 20 was initially interrupted. When power from the source 20 to the power supply 12 is restored, the following will occur. THe coil PC will be energized and cause the contacts 70 and 72 to open and the contacts 74 to close. The power supply 12 is arranged to cause the potential on the lead 22 to exponentially change from zero to −20 VDC and provide a "1" OFF return signal to lead 26 during the interval when the potential on the lead 22 is changing from zero to −12 VDC and a "0" after the negative potential on the lead 22 exceeds −12 VDC. The Zener diode 76 blocks the conduction of the transistor 66 during the change from zero to −12 VDC potential on the lead 22 and permits the transistor 66 to conduct when the negative potential on the lead 22 exceeds −12 VDC. Thus during the period when the potential on the lead 22 is changing from zero to −12 VDC, the nonconducting transistor 66 and the closed contacts 74 will cause a progressively increasing "1" signal to appear at the output terminal 88 which may be used as a blocking signal as previously described. The Zener diode 76 and the transistor 68 become conductive when the negative potential on the lead 22 exceeds −12 VDC. The conducting transistor 68 and the closed contacts 74 cause a "0" signal to appear at the terminal 88 to thus remove the blocking signal which was present during the period when the potential on the lead 22 was increasing from zero to −12 VDC.

The OFF return "1" signal which is present on the lead 22 during the interval when the potential on the lead 22 is changing from zero to −12 VDC causes the transistor 64 to conduct and supply a "0" input signal to the base of the transistor 66. The "0" input signal to the transistor 66 and the open contacts 70 cause the transistor 66 to be nonconductive and provide a progressively increasing "1" signal to appear at the lead 84.

The "1" signal on the lead 84 is selectively supplied through the contacts of the reed relay 40 as a reset signal to the bases *b* of the transistors **28*a* or 30*a*. If the reed relay 40 is in its ON bistable state, the "1" reset signal on the lead 84 will be supplied through the closed contacts 60 and 56** to the base *b* of the transistor 30*a* and cause the NOR memory 32 to switch to its ON state. If the reed relay 40 is in its OFF bistable state, the "1" reset signal on the lead 84 will be supplied through the closed contacts 60 and 58 to the base *b* of the transistor 28*a* and cause the NOR memory 32 to switch to its OFF state. Thus, during the interval when the potential on the lead 22 is changing from zero to −12 VDC, the bistable state of the NOR memory 32 will be switched to conform to the bistable state of the reed relay 40.

The power supply 12 is arranged to provide a "0" signal on the lead 26 when the negative potential on the lead 22 exceeds −12 VDC. The "0" signal on the lead 26 and the open contacts 70 cause the transistor 64 to be nonconductive and the transistor 66 to conduct. The conducting transistor 66 causes the "1" reset signal on the lead 84 to be removed so that the reed relay 40 no longer controls the bistable state of the NOR memory 32.

The contacts 72 open when power from the source 20 is restored and the coil PC is energized. The open contacts 72 prevent the coil winding MC from being energized and the contacts 78 from being closed during periods when the power supply 12 is energized by the source 20. The open contacts 78 prevent energization of the coil windings 50 and 52 and the reed relay 40 from switching when the logic system is supplied with normal input power. Thus the life of the reed relay 40 is increased and the logic system components may be switched at their maximum rate without being limited by the slower switching speeds of the reed relay.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What we claim is:

1. A retentive memory logic circuit comprising: a direct current source having a predetermined output voltage, a transistorized logic memory circuit having a selectable bistable state of operation, a latching type reed relay having a selectable bistable state of operation, circuit means energized by the direct current source and providing a plurality of connections between the memory circuit and the reed relay for causing the bistable states of the memory and the relay to coincide and means responsive to the voltage of the source for interrupting the connections between the source and the reed relay when the output voltage of the source is equal to the predetermined value and completing a first connection between the source and the reed relay during periods when the voltage of the source is decreasing from the predetermined voltage toward zero and completing a second connection between the source and reed relay during periods when the voltage of the source is increasing from zero.

2. The retentive memory circuit as recited in claim 1 wherein the completed first connection causes the bistable state of the reed relay to correspond to the bistable state of the memory and the completed second connection causes the bistable state of the memory to correspond to the bistable state of the relay.

3. The retentive memory circuit as recited in claim 1 wherein the first connection is completed during the period when the voltage of the source is decreasing from the predetermined value toward zero and reaches a fixed voltage level, and the second connection is completed during the period when the voltage of the source initially increases from zero.

4. The retentive memory circuit as recited in claim 3 wherein the first connection is provided by a relay and a conducting transistor which is switched to a nonconductive state when the decreasing source voltage equals the fixed voltage level and the second connection is provided by a set of contacts within the reed relay and a transistor that is briefly switched to a nonconductive state during the period when the source voltage is increasing from zero.

5. The retentive memory circuit as recited in claim 1 wherein the transistorized logic memory circuit includes a pair of output terminals, a pair of input terminals and transistor connected to provide an output at a first of the pair of output terminals when the logic circuit is switched to a first of its bistable states in response to an input at a first of the pair of input terminals and an output at a second of said pair of output terminals when the logic circuit is switched to a second of its bistable states in response to an input at a second of the pair of input terminals and wherein the reed relay includes a first pair of contacts that are closed when the relay is in a first of its bistable states and open when the relay is in a second of its bistable states, a second pair of contacts that are open when the relay is in the first bistable state and closed when the relay is in the second bistable state, a first coil winding connected to be energized by the source in response to an output at the first output terminal for switching the reed relay to its first bistable state, and a second coil winding connected to be energized by the source in response to an output at the second output and the means which causes the bistable state of the logic memory to correspond to the bistable state of the relay includes connections between the contacts of the relay and the inputs of the memory.

* * * * *